US008671103B2

(12) United States Patent
Wu et al.

(10) Patent No.: US 8,671,103 B2
(45) Date of Patent: Mar. 11, 2014

(54) METHOD FOR SEMANTIC SERVICE REGISTRATION AND QUERY BASED ON WORDNET

(75) Inventors: Zhaohui Wu, Hangzhou (CN); Wenqiu Zeng, Hangzhou (CN); Jian Wu, Hangzhou (CN); Ying Li, Hangzhou (CN); Shuiguang Deng, Hangzhou (CN); Jianwei Yin, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 124 days.

(21) Appl. No.: 13/318,956

(22) PCT Filed: Apr. 7, 2010

(86) PCT No.: PCT/CN2010/071609
§ 371 (c)(1),
(2), (4) Date: Nov. 4, 2011

(87) PCT Pub. No.: WO2010/127582
PCT Pub. Date: Nov. 11, 2010

(65) Prior Publication Data
US 2012/0066236 A1      Mar. 15, 2012

(30) Foreign Application Priority Data

May 7, 2009  (CN) .......................... 2009 1 0098427

(51) Int. Cl.
*G06F 17/30* (2006.01)
(52) U.S. Cl.
USPC ............. 707/755; 707/E17.014; 707/E17.058
(58) Field of Classification Search
None
See application file for complete search history.

(56) References Cited

U.S. PATENT DOCUMENTS

| 2003/0163450 | A1* | 8/2003 | Borenstein et al. ............... 707/1 |
| 2005/0043940 | A1 | 2/2005 | Elder |
| 2008/0313229 | A1* | 12/2008 | Taswell ..................... 707/104.1 |
| 2009/0204612 | A1* | 8/2009 | Keshavarz-Nia et al. ......... 707/6 |
| 2011/0119299 | A1* | 5/2011 | Fra et al. ....................... 707/769 |

FOREIGN PATENT DOCUMENTS

| CN | 10136022 A | 2/2009 |
| CN | 101567005 A | 10/2009 |
| EP | 2043009 A1 | 4/2009 |
| WO | WO2008/098130 A2 | 8/2008 |

* cited by examiner

*Primary Examiner* — Anteneh Girma
(74) *Attorney, Agent, or Firm* — Jacobson Holman PLLC; Jiwen Chen

(57) ABSTRACT

A method for semantic service registration and query based on WordNet is disclosed. The method includes the following steps: (1) semantic service registration: a service provider registers a service and uploads the Web Service Description Language (WSDL) document corresponding to the service, and a system parses the WSDL document to form a service description tree, then constructs a WordNet ontology tree according to the input of the service, performs a semantic annotation on the input/output of the service to form a Web Service Semantic Description Document (WSDL-S), and finally stores it in a register library; (2) semantic service discovery: a service requester inputs the information of service type, semantic information of the service input/output and other user-defined information to the register library to retrieve the services meeting the requirements; and (3) similarity sorting: the services meeting a certain threshold are sorted in descending order. The method has the advantages of the combination of WordNet ontology library and the semantic description language of WSDL-S, and definite semantic meaning.

5 Claims, 3 Drawing Sheets

METHOD FOR SEMANTIC SERVICE REGISTRATION AND QUERY BASED ON WORDNET

This is a U.S. national stage application of PCT Application No. PCT/CN/2010/071609 under 35 U.S.C. 371, filed Apr. 7, 2010 and published in Chinese, claiming the priority benefit of Chinese Application No. 200910098427.9, filed May 7, 2009, which is hereby incorporated by reference.

TECHNICAL FIELD

The present invention relates to registration and discovery technology of Web services, especially a semantic service registration and query method based on WordNet.

BACKGROUND OF THE ART

Web services protocols described by XML lack well-defined semantic information and interactive expression of Web services. Therefore, they cannot satisfy the requirements of automatic discovery, implementation, synthesis, monitoring and recovery of Web services. An XML based language which contains semantic information to describe Web services is required, so that Web services can understand each other on respective contents, functions and attributes. A Semantic Web just meets this demand to describe Web services. It is the extension of current Web with semantic information that can be processed by computers. In a semantic Web, all sorts of resources are manually annotated with diversified specific semantic information which can be distinguished, identified, automatically interpreted, exchanged and processed by computers.

In recent years, with the development of semantic Web technology, there have been a large number of domain ontologies, such as the medical ontology UMLS, the traditional Chinese medical ontology TCMLS and so on. Borrowing the idea of semantic Web, the semantic relations between domain concepts have been defined by constructing the ontology to solve the lack of unified semantic content of Web services and other issues. Additionally, the semantic-based search technology is adopted to discover and locate Web services to achieve win-win results between users and service providers. Integrating Semantic Web with Web services evolves into Semantic Web services. In Web services, the ontology domain model is utilized efficiently to implement conceptual modeling of services. It can guide the design of Web services applications. Semantic Web services aim to describe functions and content of Web services with an explicit language which can be understood by computers, and to improve performance and robustness of operations of the existing Web services, such as the discovery and invocation of Web services. Semantic Web services can provide effective support for automation of discovery, implementation, interpretation and composition of Web services to achieve interoperability and seamless integration of heterogeneous systems.

The prerequisite for the discovery of semantic Web services is the semantic description of required Web services from some requesters. Simultaneously, existing Web services should also be described semantically. Nowadays, there are many methods to semantically describe Web services, such as OWL-S, WSDL-S, SWSL and so on. In the above methods, the description of Web services is divided into functional and non-functional parts. For the functional information of services (Input, Output, Precondition, Effect of Web services), the basic idea of semantic description is to firstly express the semantic information in domain with ontology and then describe the functional information of Web services with concepts of ontology. For the non-functional information of Web services (such as contact information of service providers, overall function of services, etc.), the natural language is generally adopted for its semantic description at this stage.

Traditionally, the exact matching between a released service and a requested service must satisfy the following two conditions:

(1) The service output can cover the output requested by the user; In other words, the required output of the user must be able to be obtained through service invocation.

(2) The input requested by the user can satisfy the service input; In other words, the required input for normal invocation of the service must be provided within the user request.

However, while making a request, the user cannot know what sorts of services already exist, and while customizing services, it cannot be expected what kind of requests will be proposed. Therefore, it is just the most ideal state that the user request can match some service completely. In reality, the exact matching does not exist most of the time. Hence service matching algorithm is needed to calculate the similarity of released services set by the service description (including functional description and non-functional description) of requested service and released services, and then it can output services whose calculating value is greater than a given threshold.

DISCLOSURE OF THE INVENTION

The technical problem to solve in the present invention is to provide an explicit method for semantic service registration and query based on WordNet. The method combines WordNet ontology library and WSDL-S semantic description language.

The present invention adopts the following technical solution to solve the above problem.

A method comprises the specific steps of:

(1) Semantic service registration: a service provider registers a service and uploads the WSDL document corresponding to the service, and the system parses the WSDL document to form a service description tree, then constructs a WordNet ontology tree according to the input of the service, and performs a semantic annotation on the input/output of the service to form a Web Service Semantic Description Document WSDL-S, and finally stores it in a register library;

(2) Semantic service discovery: a service requester inputs the information of service category, semantic information of service input/output and other user-defined information to the register library to retrieve the services meeting the requirements;

(3) Similarity sorting: the services satisfying a certain threshold are sorted in descending order.

The semantic annotation of Web services in the Step (1) described in the present invention is based on the interface information of the input and output function in the WSDL document to annotate semantic ontology and form a Web Service Semantic Description Document WSDL-S, wherein, the semantic ontology adopts the WordNet ontology library.

In the described Step (2) of the present invention, a WordNet ontology tree is adopted to calculate the semantic distance between two ontology concepts by using the interfaces provided by WordNet. An expansion algorithm for extended bipartite graph optimal matching is adopted to obtain the semantic similarity between the input/output of the requested service and that of the released service, and then to obtain the semantic similarity between the requested service and the released service. The expansion algorithm for extended bipartite graph optimal matching is used to match the semantic information set of the input/output parameters of the corresponding operation of services. During the matching process, the input, output and overall semantic similarity between the requested service and the services in register library are calculated, respectively. If the three similarities all satisfy respective thresholds, the matching is successful, indicating that the service matches the user request.

The said Step (2) in the present invention works as follows:
(A) pre-filtering Service for Semantic Description Document according to the category of the service by checking which registered services belong to the category of the requested service and then searching in the database to obtain all services within certain service category; then, turning to the next step;
(B) parsing the Service Semantic Description Documents of the filtered services to obtain input/output semantic information and store it in a list to prepare for the following input/output matching;
(C) matching input/output parameter sets of the operation corresponding to the service based on the semantics information and the relevant thresholds provided by the requested query, and adding the service to the matching result only if (i) input/output numbers of the service satisfy the requested service, (ii) the input match degree is greater than its given threshold, (iii) the output match degree is greater than its given threshold and (iv) the overall match degree is greater than its given threshold; otherwise, if any one of the above conditions is not satisfied, directly skipping the rest of the action of this service match process and turning to match the next service in the register library;

In addition, the said Step (C) comprises substeps of:
(a) comparing the input/output numbers of the services; if the requested output number is greater than the output number of a certain service in the register library, or the requested input number is less than the input number of a certain service in the register library, directly skipping this substep and turning to match the next service operation;
(b) adopting the extended bipartite graph optimal matching expansion algorithm to calculate the output semantic similarity; if the output semantic similarity is greater than the given threshold, continuing; otherwise, skipping this substep and turning to match the next service operation;
(c) adopting the optimal matching expansion algorithm based on bipartite graph to calculate the input semantic similarity; if the input semantic similarity is greater than the given threshold, continuing; otherwise, skipping this substep and turning to match the next service operation;
(d) calculating the overall semantic similarity according to the output semantic similarity and the input semantic similarity; if the overall similarity is greater than the given threshold, indicating the match is successful; otherwise, skipping this substep and turning to match the next service operation.

In the said Step (3) of the present invention, based on the service set of semantic service inquiries, services matching the user request are sorted by their similarity. Services are sorted by input, output and overall similarity, so that users can quickly find the satisfactory services.

Compared with prior art, the present invention has the following beneficial effects: 1. Based on WordNet ontology library and its interfaces, it is easy for secondary development to calculate the semantic distance between two ontology concepts; 2. A semantic description method is added to WSDL document of services to form semantic description document WSDL-S, which is compatible with the existing protocols and technology; 3. Service match based on semantic similarity supports flexible match of services. It can measure the match degree between the registered services and the requested service, but also greatly improve the recall ratio and precision rate of services. Overall semantic similarity is calculated according to the input and output semantic similarities as well as respective weight, which can be set by the user based on the demands for the requested service. This method can be used by users to quickly find the desired services; 4. Services obtained through the queries are sorted based on similarity, which can help users to find satisfactory services.

IMPLEMENTATION EMBODIMENTS OF THE INVENTION

Web services are software applications achieving certain functions or executing business processes on Internet. Web services can be released as well as discovered and invoked by users on the Web. As an emerging model of Web applications, Web service technology is an effective mechanism to integrate data and information on the Web. It has become the most reasonable solution in the current application environment.

The main design idea of the present invention is to combine WordNet ontology library and WSDL-S semantic description language to design a semantically explicit discovery mechanism for Web services. Domain concepts provided by WordNet, as the foundation of the related ontology in the global domain, can be used to perform semantic annotation for Web services and form WSDL-S semantic description document. Using the relation of words in WordNet ontology library, the semantic distance between two words can be calculated, and then the semantic similarity between a requested service and any of the services in register library can be calculated. The KM algorithm is extended to calculate the semantic similarity between two services during the calculation of the requested service and the services in the register library. A service match algorithm is adopted to obtain the services satisfying user requests and these services are sorted by similarity.

WordNet is an online English vocabulary retrieval system and also a semantic dictionary. It uses semantic network as the basic representation of its lexicon ontology. In WordNet, the relation between/among network nodes includes synonymous relation, antonymous relation, inheritance relation, part/whole relation and so on. The semantic distance between ontology concepts is shown in the following table:

| Relation | Weight |
| --- | --- |
| Equivalence relation | 0 |
| Inheritance relation | 1 |
| Inclusion relation | 2 |

In conjunction with the drawings, the entire implementation process of semantic registration and query is described in detail as below.

Figure 1:
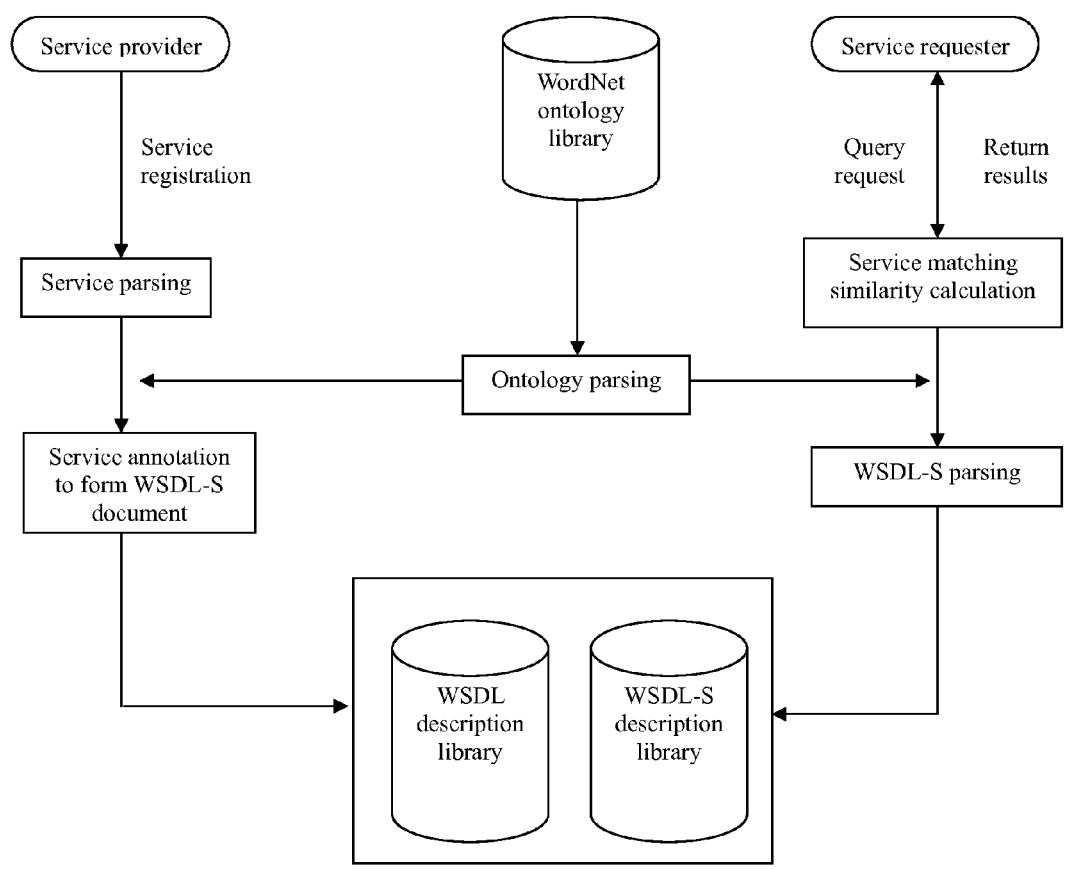
FIG. 1 shows the system structure of the present invention.

With reference to FIG. 1, the specific steps of the method are as follows:
(1) Semantic service registration: a service provider registers a service and uploads the WSDL document corresponding to the service, and the system parses the WSDL document to form a service description tree, then constructs a WordNet ontology tree according to the input of the service, and performs a semantic annotation on the input/output of the service to form a Web Service Semantic Description Document WSDL-S, and finally stores it in a register library;

(2) Semantic service discovery: a service requester inputs the information of service type, semantic information of service input/output and other user-defined information to the register library to retrieve the services satisfying the requirements;

(3) Similarity sorting: the services satisfying a certain threshold are sorted in descending order.

Figure 2:
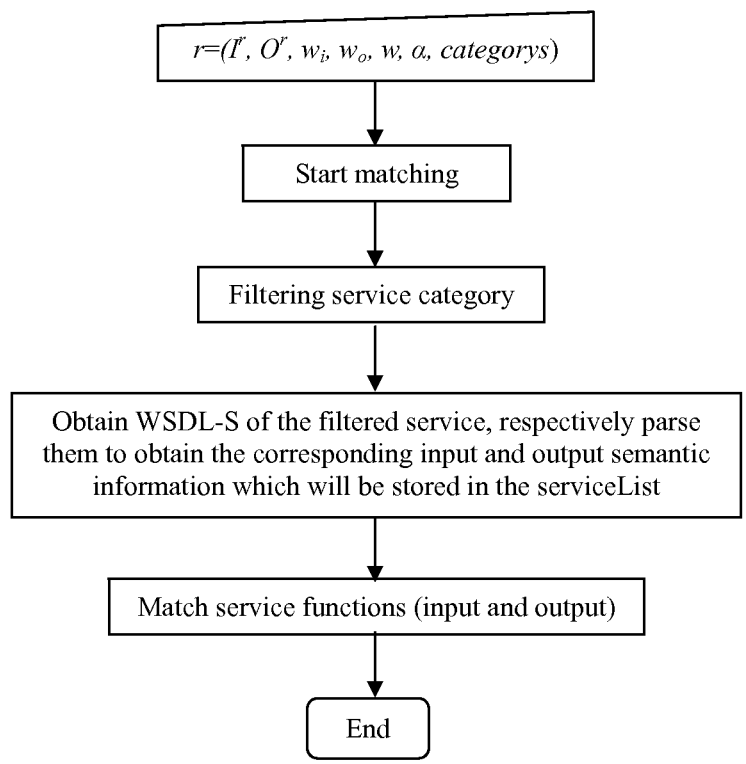
FIG. 2 is the overall flowchart of semantic query algorithm in the present invention.
Figure 3:
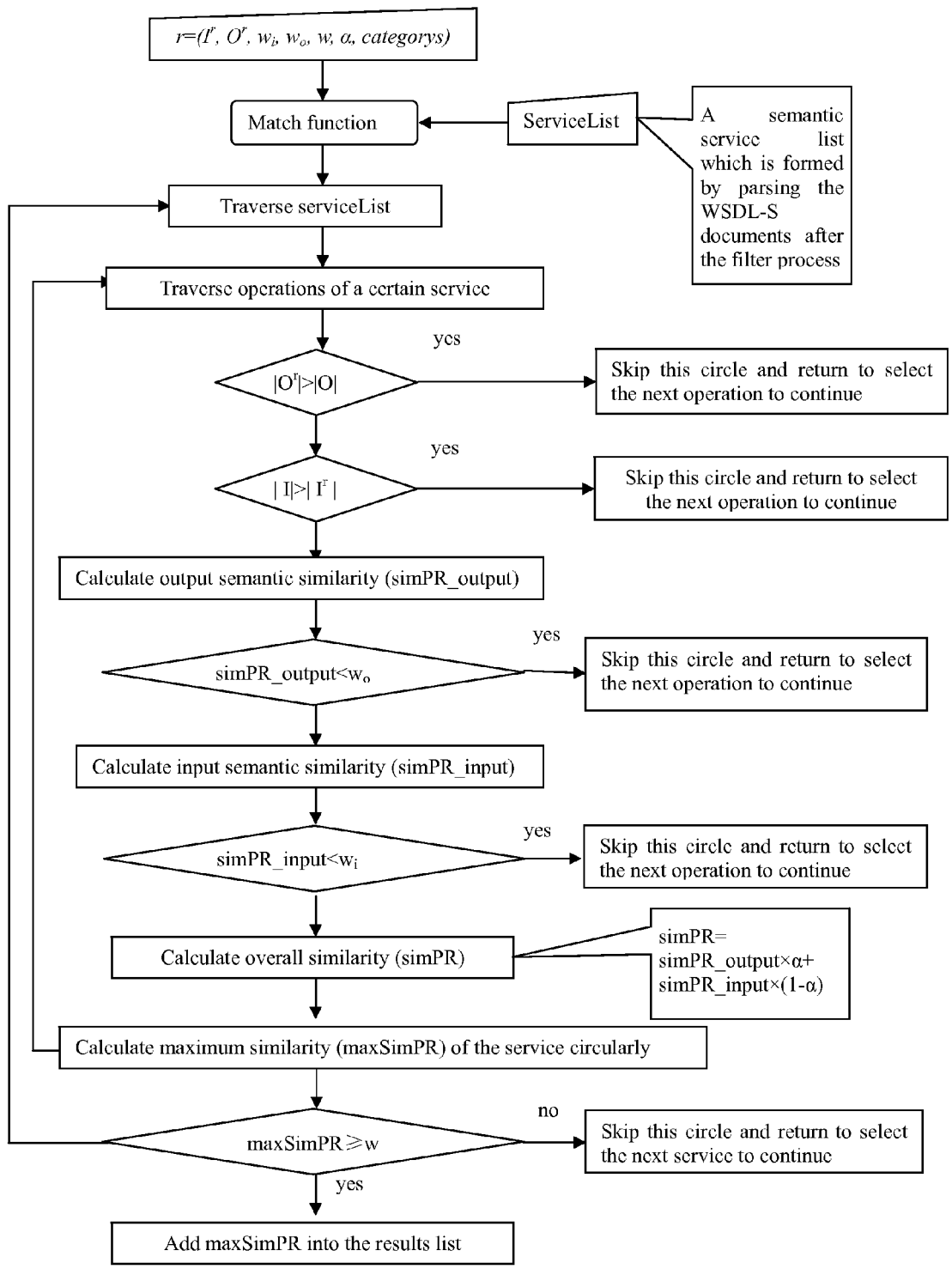
FIG. 3 is the flowchart of service function matching in the present invention.

With reference to FIG. 2, the above Step (2) works as follows:

(A) Filtering is performed based on the category of services. If there are a huge number of services in the service register library, for one semantic query, it will take a long time to parse and compare the XML file containing the semantic information of every service in register library. Service category filtering can be a pre-treatment before service matching by matching engine The pretreatment checks which registered services belong to the category of the requested service and searches in the database to obtain all services with the same service category. And then go to the next step. If the user knows in advance which categories the service belongs to, the service will be quickly found;

(B) The Service Semantic Description Documents of the filtered services are parsed to obtain the input/output semantic information which will be stored in a list to prepare for the following input/output match;

(C) Based on the semantic information and relevant thresholds provided by the query instance $r=(I^r, O^r, w_i, w_o, w, \alpha, categorys)$, input/output parameter set of the operation corresponding to the service is matched. Only if (i) input/output number of the service satisfies the service request, (ii) the input match degree is greater than $w_i$, (iii) the output match degree is greater than $w_o$ and (iv) the overall match degree is greater than w, then the service is added to matching results. As long as any one of the conditions is not met, the rest of the match operation of the service will be skipped and the next service will be matched;

With reference to FIG. 3, the above Step (C) works as follows:

(a) If the next element in serviceList is not null, obtaining the semantic description information of the service, otherwise ending the match;

(b) For the operation list (operationList) of the service obtained in previous step, if the next element in operationList is not null, continuing; otherwise, skipping the rest and turn to Step (a);

(c) Based on the query instance "r" and obtained operation, if the number of request output is greater than the output number of a certain service in register library, directly skipping the rest and turn to Step (b); otherwise, continuing;

(d) If the number of the requested input is less than the input number of a certain service in the register library, directly skipping the rest and turning to Step (b); otherwise, continuing;

(e) Based on the expansion algorithm for bipartite graph optimal matching, the output semantic similarity (simPR_output) is calculated. If simPR_output is less than the threshold $w_o$, directly skipping the rest and turning to Step (b), otherwise, continuing;

(f) Based on the expansion algorithm for bipartite graph optimal matching, the input semantic similarity (simPR_input) is calculated. If simPR_input is less than the threshold $w_i$, directly skipping the rest and turning to Step (b); otherwise, continuing;

(g) The overall similarity of a service operation is calculated based on simPR_output, simPR_input and $\alpha$, namely, simPR=$\alpha \times$simPR_output+$(1-\alpha)\times$simPR_input, wherein $\alpha$ is inputted by the user during the query. The weight of input and output semantic similarity can be set based on actual demands for services;

(h) Step (a)-(g) is executed circularly to obtain the maximum service semantic similarity (maxSimPR). If maxSimPR is greater than the threshold w, the match is successful, then skipping to Step (a) to continue the match.

The models below are used in semantic service registration and discovery:

1. Service semantic description model, a service s is a 2-tuple $s=(n_s, P)$, wherein:
    (1) $n_s$ is the name of the service;
    (2) $P=\{p_1, p_2, \ldots, p_n\}$ is a set of operations of the service.

2. Operation semantic description model, the operation of a service p is a 3-tuple $p=(n_p, I, O)$, wherein:
    (1) $n_p$ is the name of the operation;
    (2) $I=\{i_1, i_2, \ldots, i_n\}$ is a concept vector which indicates the semantic description of N input parameters of the operation p, and $i_1, i_2, \ldots, i_n$ denote the semantic concepts in the domain ontology library corresponding to the input parameters of the operation p;
    (3) $O=\{o_1, o_2, \ldots, o_m\}$ is a concept vector which indicates the semantic description of M output parameters of the operation p, and $o_1, o_2, \ldots, o_m$ denote the semantic concepts in the domain ontology library corresponding to the output parameters of the operation p;

In this way, the matching of Web services is converted into the matching between the ideal service semantic description model $s=(n_s, P)$ of the requester and the service semantic description model $s'=(n_s', P')$ in the service library, and then is converted into the match between the operation P and P', finally is converted into the matching between the concept vector I & I' and O & O' in the same domain ontology.

3. Semantic description model of service request is the description of the user requirement for a target service. A service request $r=(I^r, O^r, w_i, w_o, w, \alpha, categorys)$ can be formulated as a 7-tuple, wherein:
    (1) $I=\{i_1^r, i_2^r, \ldots, i_n^r\}$ is a concept vector which indicates the semantic description of input parameters of the user request, wherein $i_1^r, i_2^r, \ldots, i_n^r$ are semantic concepts in the domain ontology library corresponding to the input parameters of the user request;
    (2) $O^r=\{o_1^r, o_2^r, \ldots, o_m^r\}$ is a concept vector which indicates the semantic description of output parameters of the user request, wherein $o_1^r, o_2^r, \ldots, o_m^r$ are semantic concepts in the domain ontology library corresponding to the output parameters of the user request;
    (3) $\alpha$ is the output weight and $1-\alpha$ is the input weight;
    (4) $0<w_i \leq 1$ is the acceptable input threshold set by the user, that is, if the similarity between the input of a service (essentially refers to the operation of a service) and the input of the requested service is less than the threshold, the service is considered as an unacceptable target service. The default $w_i$ is generally 0.5;
    (5) $0<w_o \leq 1$ is the acceptable output threshold set by the user, that is, if the similarity between the output of a service (essentially refers to the operation of a service) and the output of the service request is less than the threshold, the service is considered as an unacceptable target service. The default $w_o$ is generally 0.5;

(6) $0<w\leq 1$ ($w=w_o*\alpha+w_i*(1-\alpha)$) is the acceptable threshold set by the user, that is, only if the similarity between a service (essentially refers to the operation or combination of operations of a service) and the service request is not less than the threshold, the service is considered as an acceptable target service. The default w is generally 0.5;

(7) categorys represents the type of the requested service. If it is not specified, it is necessary to look up in all categories.

The invention claimed is:

1. A method for semantic service registration and query based on WordNet, characterized in that the method comprising the specific steps of:

(1) allowing a service provider to register a service and upload a WSDL document corresponding to the service, and allowing a system to parse the WSDL document to form a service description tree, then to construct a WordNet ontology tree according to input of the service, and to perform a semantic annotation on input/output of the service to form a Web Service Semantic Description Document WSDL-S, and finally to store it in a register library;

(2) allowing a service requester to input information of service category, semantic information of service input/output and other user-defined information to the register library to retrieve the services satisfying the requirements; which operates as follows:

using a WordNet ontology tree to calculate semantic distance of two ontology concepts by using interfaces provided by WordNet, then adopting an expansion algorithm for extended bipartite graph optimal matching to obtain semantic similarity between the input/output of requested service and that of released service, further to obtain semantic similarity between the requested service and the released service; wherein, the expansion algorithm for extended bipartite graph optimal matching is used to match semantic information set of input/output parameters of corresponding operation of services, and during the matching process, the input, output and overall semantic similarities between the requested service and the services in register library are respectively calculated, if the three similarities all satisfy respective thresholds, the matching is successful, indicating that the service matches the user request;

(3) sorting the services satisfying a certain threshold in descending order.

2. The method for semantic service registration and query based on WordNet as described in claim 1, characterized in that the semantic annotation of Web services in the said Step (1) is based on the interface information of input and output function in the WSDL document to annotate semantic ontology and form a Web Service Semantic Description Document WSDL-S, wherein, the semantic ontology adopts a WordNet ontology library.

3. The method for semantic service registration and query based on WordNet as described in claim 1, characterized in that, the said Step (2) operates as follows:

(A) pre-filtering Service for Semantic Description Document according to the category of the service by checking which registered services belong to the category of the requested service and then searching in a database to obtain all services within certain service category; then, turning to next step;

(B) parsing the Service Semantic Description Documents of the filtered services to obtain the corresponding input/output semantic information and storing it in a list to prepare for the following input/output matching;

(C) matching input/output parameter sets of the operation corresponding to the service based on the semantic information and the relevant thresholds provided by the requested query, and adding the service to the matching result only if (i) input/output numbers of the service satisfy the requested service, (ii) input match degree is greater than its given threshold, (iii) output match degree is greater than its given threshold and (iv) overall match degree is greater than its given threshold, otherwise, if any one of the above conditions is not satisfied, directly skipping the rest of the action of this service match process and turning to match next service in the register library.

4. The method for semantic service registration and query based on WordNet as described in claim 3 characterized in that the said Step (C) comprises substeps of:

(a) comparing the input/output numbers of the services, if the requested output number being greater than the output number of a certain service in the register library, or the requested input number being less than the input number of a certain service in the register library, directly skipping this substep and turning to match next service operation (b) adopting an extended bipartite graph optimal matching expansion algorithm to calculate output semantic similarity, if the output semantic similarity being greater than a given threshold, continuing, otherwise skipping this substep and turning to match next service operation;

(c) adopting the optimal matching expansion algorithm based on bipartite graph to calculate input semantic similarity, if the input semantic similarity being greater than the given threshold, continuing, otherwise skipping this substep and turning to match next service operation;

(d) calculating overall semantic similarity according to the output semantic similarity and the input semantic similarity, if the overall similarity being greater than another given threshold, indicating the match is successful, otherwise skipping this substep and turning to match next service operation.

5. The method for semantic service registration and query based on WordNet as described in claim 1, characterized in that, in the said Step (3), based on service set of semantic service inquiries, services matching the user request are sorted by their similarity, wherein, services are sorted by input, output and overall similarity so that users can quickly find satisfactory services.

* * * * *